US011991238B2

(12) United States Patent
O'Shaughnessy

(10) Patent No.: US 11,991,238 B2
(45) Date of Patent: *May 21, 2024

(54) SHARING NETWORK ADDRESSES

(71) Applicant: Verizon Patent and Licensing Inc., Basking Ridge, NJ (US)

(72) Inventor: Timothy O'Shaughnessy, Washington, DC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

This patent is subject to a terminal disclaimer.

(21) Appl. No.: 17/380,981

(22) Filed: Jul. 20, 2021

(65) Prior Publication Data

US 2022/0014583 A1   Jan. 13, 2022

Related U.S. Application Data

(63) Continuation of application No. 16/260,874, filed on Jan. 29, 2019, now Pat. No. 11,102,270, which is a continuation of application No. 15/688,853, filed on Aug. 28, 2017, now Pat. No. 10,237,332, which is a continuation of application No. 14/075,610, filed on
(Continued)

(51) Int. Cl.
| | | |
|---|---|---|
| *G06F 15/16* | (2006.01) | |
| *G06F 16/955* | (2019.01) | |
| *H04L 67/06* | (2022.01) | |
| *H04L 61/30* | (2022.01) | |
| *H04L 61/4552* | (2022.01) | |

(52) U.S. Cl.
CPC .......... *H04L 67/06* (2013.01); *G06F 16/9562* (2019.01); *H04L 61/30* (2013.01); *H04L 61/4552* (2022.05)

(58) Field of Classification Search
CPC ......... H04L 67/06; H04L 67/01; H04L 61/30; H04L 61/4552; H04L 61/45; G06F 16/9562
USPC ................................ 709/203, 217, 218, 219
See application file for complete search history.

(56) References Cited

U.S. PATENT DOCUMENTS

| | | |
|---|---|---|
| 5,625,781 A | 4/1997 | Cline et al. |
| 5,764,910 A | 6/1998 | Shachar |

(Continued)

FOREIGN PATENT DOCUMENTS

| | | | |
|---|---|---|---|
| WO | WO-2006/004544 A2 | 1/2006 | |
| WO | WO-2006004544 A2 * | 1/2006 | ........ G06F 17/30112 |

OTHER PUBLICATIONS

"Del.icio.us", Wikipedia, Retrieved from the Internet: http://en.wikipedia.org/windex.php?title=Del.icio.us&printable=yes, on Feb. 21, 2006, 2 pages.
(Continued)

*Primary Examiner* — Kaylee J Huang

(57) ABSTRACT

A network address assigned a shared designation by a first client computer is received, in a first data format, automatically, at a host computer from the first client computer. The network address is categorized and published. Publishing the network address includes converting the network address into a second data format, receiving, at the host computer, a subscription request from a second client computer, and sending the network address to the second client computer in response to receiving the subscription request.

20 Claims, 9 Drawing Sheets

Related U.S. Application Data

Nov. 8, 2013, now Pat. No. 9,749,392, which is a continuation of application No. 11/548,944, filed on Oct. 12, 2006, now Pat. No. 8,601,162.

(60) Provisional application No. 60/820,535, filed on Jul. 27, 2006.

(56) References Cited

U.S. PATENT DOCUMENTS

| | | | |
|---|---|---|---|
| 5,784,564 A | 7/1998 | Camaisa et al. | |
| 5,796,393 A | 8/1998 | MacNaughton et al. | |
| 5,870,552 A | 2/1999 | Dozier et al. | |
| 5,966,441 A | 10/1999 | Calamera | |
| 6,208,995 B1* | 3/2001 | Himmel | G06F 16/9562 707/999.009 |
| 6,546,393 B1* | 4/2003 | Khan | G06F 16/9562 |
| 6,654,807 B2 | 11/2003 | Farber et al. | |
| 6,801,906 B1* | 10/2004 | Bates | G06F 16/9535 707/999.005 |
| 6,871,213 B1 | 3/2005 | Graham et al. | |
| 6,981,210 B2 | 12/2005 | Peters et al. | |
| 7,080,139 B1 | 7/2006 | Briggs et al. | |
| 7,325,192 B1* | 1/2008 | Bialek | G06F 16/958 715/224 |
| 7,831,928 B1* | 11/2010 | Rose | G06F 3/0483 715/810 |
| 8,214,463 B2 | 7/2012 | Ahn et al. | |
| 2001/0016872 A1* | 8/2001 | Kusuda | H04L 69/329 709/219 |
| 2002/0059272 A1 | 5/2002 | Porter | |
| 2002/0065819 A1* | 5/2002 | Yoshiura | G06F 16/951 707/999.005 |
| 2002/0069378 A1 | 6/2002 | McClellan et al. | |
| 2002/0072974 A1 | 6/2002 | Pugliese, III et al. | |
| 2002/0099784 A1* | 7/2002 | Tran | G06F 16/9562 709/212 |
| 2002/0108060 A1* | 8/2002 | Takamoto | H04L 63/083 709/217 |
| 2003/0225836 A1 | 12/2003 | Lee et al. | |
| 2004/0039827 A1 | 2/2004 | Thomas et al. | |
| 2004/0061720 A1 | 4/2004 | Weber | |
| 2005/0033736 A1 | 2/2005 | Carlin et al. | |
| 2005/0278297 A1 | 12/2005 | Nelson | |
| 2006/0064434 A1 | 3/2006 | Gilbert et al. | |
| 2006/0069699 A1 | 3/2006 | Smadja et al. | |
| 2006/0129642 A1 | 6/2006 | Qian et al. | |
| 2006/0143236 A1 | 6/2006 | Wu | |
| 2006/0161742 A1* | 7/2006 | Sugimoto | H04N 21/47217 348/E7.071 |
| 2006/0242554 A1* | 10/2006 | Gerace | G06Q 30/02 715/209 |
| 2007/0050445 A1* | 3/2007 | Hyndman | G06F 16/951 709/203 |
| 2007/0067217 A1* | 3/2007 | Schachter | G06Q 30/02 705/14.66 |
| 2007/0067297 A1 | 3/2007 | Kublickis | |
| 2007/0067331 A1* | 3/2007 | Schachter | G06Q 30/02 707/999.102 |
| 2007/0078884 A1 | 4/2007 | Ott, IV et al. | |
| 2007/0124208 A1* | 5/2007 | Schachter | G06Q 50/01 705/310 |
| 2007/0220048 A1* | 9/2007 | Ott | H04H 20/82 |
| 2007/0260603 A1 | 11/2007 | Toscana et al. | |
| 2007/0282962 A1* | 12/2007 | Kim | G06Q 10/107 709/207 |
| 2008/0010286 A1 | 1/2008 | Zhang et al. | |
| 2008/0288588 A1 | 11/2008 | Andam et al. | |
| 2010/0169961 A1 | 7/2010 | Huh et al. | |
| 2010/0280903 A1 | 11/2010 | Barlin et al. | |
| 2011/0022528 A1 | 1/2011 | Hennessy et al. | |

OTHER PUBLICATIONS

"Exclusive Screenshots of Omnidrive", Michael Arrington, Retrieved from the Internet: http://www.techcrunch.com/2006/07/25/exclusive-screenshots-of-omnidrive/, on Jul. 26, 2006, 7 pages.

"Social Bookmarking", Wikipedia, Retrieved from the Internet: http:/wikipedia.org/windexphp?title=Social bookmarking&printable=yes, on Aug. 16, 2006, 3 pages.

Heinz Wittenbrink; RSS and Atom: Understanding and Implementing Content Feeds and Syndication: A clear and concise guide to strategy, structure, selection with in depth technical . . . of feed formats and XML vocabularies; Aug. 11, 2005; Packt Publishing; p. 139.

Hammond, Tony et al., Social Bookmaking Tools, Apr. 2005; D-Lib Magazine, 23 pages.

\* cited by examiner

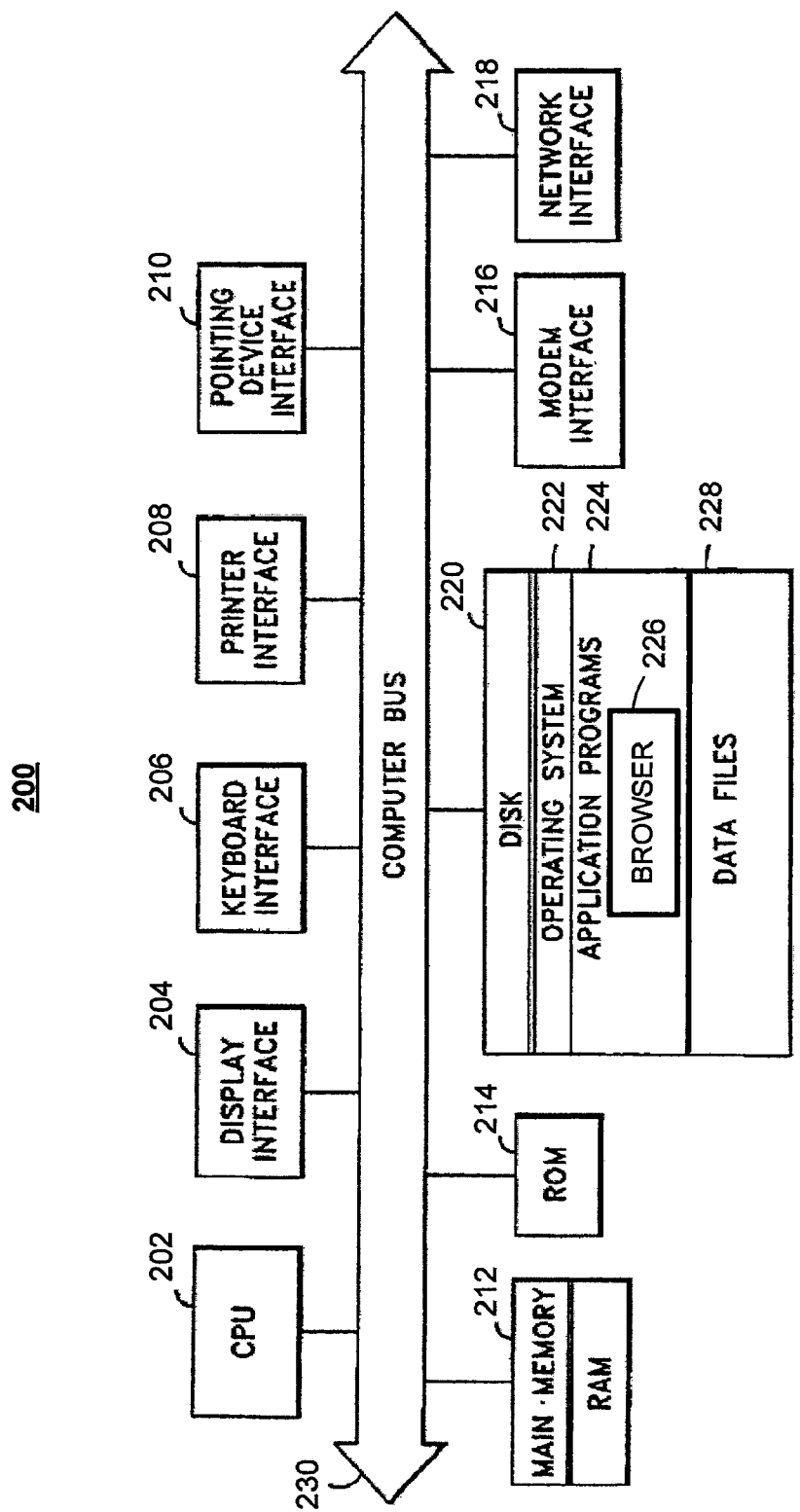
FIG. 2α

| | NETWORK ADDRESS | TIME/DATE SHARED | SHARING USER | CATEGORY | GROUP |
|---|---|---|---|---|---|
| 250 | WWW.ESPN.COM | 9:26 9-3-05 | BRIAN JONES | SPORTS | JONES' FAMILY HEADLINES |
| 252 | WWW.CNN.COM | 19:21 9-4-05 | BRIAN JONES | NEWS | JONES' FAMILY HEADLINES |
| 254 | WWW.FOXNEWS.COM | 19:25 9-4-05 | BRIAN JONES | NEWS | JONES' FAMILY HEADLINES |
| 256 | WWW.MSNBC.COM | 20:11 9-4-05 | CAROL JONES | NEWS | JONES' FAMILY HEADLINES |
| 258 | WWW.CBSNEWS.COM | 4:34 9-5-05 | CAROL JONES | NEWS | JONES' FAMILY HEADLINES |
| 260 | WWW.CBSSPORTSLINE.COM | 4:36 9-5-05 | CAROL JONES | SPORTS | JONES' FAMILY HEADLINES |
| 262 | WWW.CNNSI.COM | 7:08 9-5-05 | CATHY JONES | SPORTS | JONES' FAMILY HEADLINES |
| 264 | WWW.WASHINGTONPOST.COM | 11:18 9-6-05 | BRIAN JONES | NEWS | JONES' FAMILY HEADLINES |
| 266 | WWW.EXPEDIA.COM | 11:19 9-6-05 | SARA SMITH | TRAVEL | SMITH FAMILY TRAVEL |
| 268 | WWW.TRAVELOCITY.COM | 11:20 9-6-05 | SARA SMITH | TRAVEL | SMITH FAMILY TRAVEL |
| 270 | WWW.ORBITZ.COM | 14:53 9-11-05 | TOM SMITH | TRAVEL | SMITH FAMILY TRAVEL |

*FIG. 2B*

| GROUP NAME | ALLOWED SUBSCRIBERS |
|---|---|
| JONES' FAMILY HEADLINES | BRIAN JONES |
| | CAROL JONES |
| | CATHY JONES |
| SMITH FAMILY TRAVEL | SARA SMITH |
| | TOM SMITH |

*FIG. 2C*

| SUBSCRIBER | TIME PREFERENCES | PUBLISHER PREFERENCES | CATEGORY PREFERENCES |
|---|---|---|---|
| MIKE DONALD | 5 DAYS | CAROL JONES<br>CATHY JONES<br>TOM SMITH | SPORTS<br>NEWS<br>TRAVEL<br>MUSIC<br>SHAKESPEARE |
| SCOTT DONALD | | BRIAN JONES<br>CATHY JONES | SPORTS<br>NEWS |
| JIM DONALD | 14 DAYS | | TRAVEL<br>FOOD<br>ART<br>WINE |

*FIG. 2D*

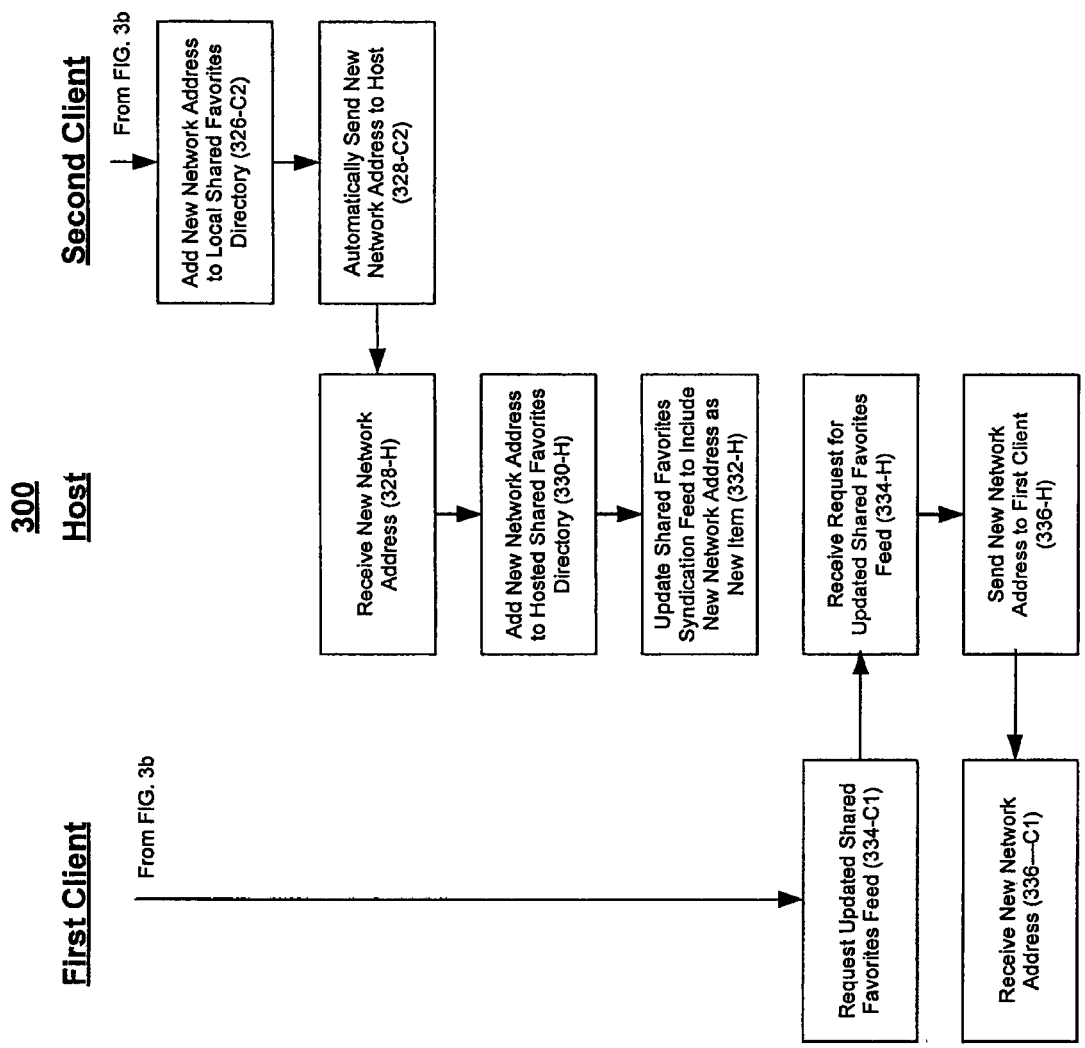

SHARING NETWORK ADDRESSES

CROSS-REFERENCE TO RELATED APPLICATION(S)

The present application is a continuation of U.S. Nonprovisional patent application Ser. No. 16/260,874, filed on Jan. 29, 2019, which is a continuation of U.S. patent application Ser. No. 15/688,853, filed Aug. 28, 2017, now U.S. Pat. No. 10,237,332, issued Mar. 19, 2019, which is a continuation of U.S. patent application Ser. No. 14/075,610, filed Nov. 8, 2013, now U.S. Pat. No. 9,749,392, issued Aug. 29, 2017, which is a continuation of U.S. patent application Ser. No. 11/548,944, filed Oct. 12, 2006, now U.S. Pat. No. 8,601,162, issued Dec. 3, 2013, which claims the benefit of priority from U.S. provisional Patent Application No. 60/820,535 filed Jul. 27, 2006, the entire contents of which are incorporated herein by reference for all purposes.

TECHNICAL FIELD

This description relates to sharing network addresses.

BACKGROUND

A web browser may allow a user to create a shortcut to a favorite web page or network resource by creating and saving a pointer that points to the uniform resource locator ("URL") or network address of the web page or network resource. Such a shortcut is referred to variously as, for example, a favorite or a bookmark, and generally is stored in a local directory referred to variously as, for example, a favorites list, a bookmark list, or a hotlist. (Hereinafter, such directories will be referred to typically as a favorites list or more generally as favorites.) For example, a web browser may allow a user to add the network address of a currently-loaded web page to the user's favorites list by selecting "Favorites" from the browser tool bar and then selecting "Add to favorites . . . " from the resulting drop-down menu. After a user has added a network address to the user's favorites list, the user can navigate to the network address by selecting the network address from the user's favorites list instead of manually entering the network address in the browser's address window.

In addition, a web browser also may allow the user to assign a title to a network address stored in the user's favorites list in order to help the user recognize the network address more easily. Additionally or alternatively, the web browser may assign the network address a default title automatically. For example, the web browser may assign the network address a default title that is the same as the title assigned to the web page available at the network address.

Furthermore, a web browser may allow a user to organize the user's favorites list in a hierarchical fashion by enabling the user to create a nested directory of folders and subfolders of network addresses. Allowing a user to organize the user's favorites list in a hierarchical fashion may help the user to locate and find a particular network address quickly and easily, especially when the user has added a large number of network addresses to the user's favorites list.

SUMMARY

In one aspect, a network address assigned a shared designation by a first client computer is received in a first data format, automatically, at a host computer from the first client computer. The network address is categorized and published. Publishing the network address includes converting the network address into a second data format, receiving, at the host computer, a subscription request from a second client computer, and sending the network address to the second client computer in response to receiving the subscription request.

Implementations may include one or more of the following features. The second data format may be a feed format. A new network address assigned a shared designation by the first computer may be received in the first data format, automatically, at the host computer from the first client computer. The new network address may be categorized and published. Publishing the new network address may include converting the new network address into the second data format, and sending the new network address to the second client computer.

In addition, a new network address assigned a shared designation by a third client computer may be received in the first data format, automatically, at the host computer from the third client computer. The new network address may be categorized and published. Publishing the new network address may include converting the new network address into the second data format, and sending the new network address to the second client computer.

Furthermore, a new network address assigned a shared designation by the second client computer may be received in the first data format, automatically, at the host computer from the second client computer. The new network address may be categorized and published. Publishing the new network address may include converting the network address into the second data format, and sending the new network address to the first client computer.

In another general aspect, a network address assigned a shared designation by a first client computer is received, automatically, at a host computer from the first client computer. In addition, a subscription request from a second client computer is received at the host computer and the network address is sent to the second client computer in response to receiving the subscription request.

Implementations may include one or more of the following features. The network address may be published. In addition, the network address may be stored in a shared directory on the host computer. The shared directory may include a plurality of network addresses and the subscription request may include a filtering criterion. At least one of the plurality of network addresses that satisfies the filtering criterion may be sent to the second client computer. Additionally or alternatively, each of the plurality of network addresses also may include category data, source data, or publication time data, and the filtering criterion may be category, source, or publication time. In addition, the shared directory may be searched for an instance of the network address, and it may be determined that the instance of the network address is stored in the shared directory. Based on the determination that the instance of the network address is stored in the shared directory, the network address may be deleted.

Furthermore, a new network address assigned a shared designation by the second client computer may be received, automatically, from the second client computer. The new network address may be published and sent to the first client computer. The new network address also may be stored in the shared directory on the host computer.

In addition, the new network address may be converted into an alternative data format. The alternative data format may be a feed format. For instance, the alternative data format may be an extensible markup language ("XML")- based format such as, for example, a resource description framework ("RDF") site summary ("RSS") format, a rich site summary ("RSS") format, a really simple syndication ("RSS") format, or an Atom format.

Authentication information also may be received from the first client computer, and the subscription request may be authenticated based upon the authentication information. In addition, sending the network address to the second client computer may be conditioned upon successful authentication of the subscription request. The authentication information may be a roster such as, for example, an authorized user roster or an authorized computer roster. Authenticating the subscription request based upon the authentication information may include comparing the authentication information to the subscription request and the authentication information may be a password.

A new network address assigned a shared designation by a third client computer also may be received, automatically, at the host computer from the third client computer. The new network address may be published and sent to the second client computer.

Authentication information may be received from the first client computer. In addition, a request to publish network addresses may be received from the third client computer. The request to publish network addresses may be authenticated conditioned upon the authentication information and publishing the new network address may be based upon successful authentication of the request to publish network addresses.

A new network address assigned a shared designation by the first client computer may be received, automatically, at the host computer from the first client computer. The new network address may be published. In addition, the new network address may be sent to the second client computer.

In addition, a subscription request from a third client computer may be received at the host computer, and the network address may be sent to the third client computer in response to receiving the subscription request from the third client computer.

The network address may be categorized. Categorizing the network address may include accessing an Open Directory Project ("ODP") category indication for the network address, and associating the network address with the ODP category indication. Additionally or alternatively, categorizing the network address may include parsing the content available at the network address, and associating the network address with a category indication based on the parsed content.

The network address may include network address data and comment data, network address data and category data, network address data and representative image data, or network address data and a source indication that identifies a publishing user associated with the network address. The source indication may include a screen name and an alert indication indicating that the network address has been published may be accessed. In addition, the alert indicator may be displayed in association with display of the screen name in a buddy list.

In another general aspect, a device includes a receiver for receiving one or more network addresses assigned a shared designation by a first client computer, automatically, from a first client computer and receiving a subscription request from a second client computer. In addition, the device includes a publisher for publishing the network addresses, and a sender for sending one or more of the network address to the second client computer in response to the receiver receiving the subscription request.

Implementations may include one or more of the following features. The device may include a memory including a shared directory. The shared directory may be configured for storing the network address. The device also may include a filter for filtering the network addresses sent to the second client computer and a categorizer for categorizing the network addresses.

In still another general aspect, a system includes a first client computer, a host computer, and a second client computer. The first client computer is configured to assign a shared designation to a network address and automatically send the network address to the host computer in response to assigning the network address a shared designation. The host computer includes a receiver for receiving the network address from the first client computer and receiving a subscription request from a second client computer. The host computer also includes a publisher for publishing the network address, and a sender for sending the network address to the second client computer in response to the receiver receiving the subscription request. In addition, the second client computer is configured to send the subscription request to the host computer and receive the network address from the host computer.

Implementations may include one or more of the following features. For example, the first client computer may be configured to issue a query to a user of the first client computer to determine whether the network address is to be assigned a shared designation. The query may be conditioned on an indication that suggests that the user desires that the network address be assigned a shared designation.

In another general aspect, a computer readable medium includes instructions that are executable to cause a processor to receive a network address assigned a shared designation by a first client computer, automatically, from the first client computer and to publish the network address. In addition, the computer readable medium includes instructions that are executable to cause a processor to receive a subscription request from a second client computer and send the network address to the second client computer in response to receiving the subscription request.

Implementations may include one or more of the following features. The computer readable medium may include instructions that are executable to cause a processor to receive a new network address assigned a shared designation by a second client computer, automatically, from the second client computer and to publish the new network address. In addition, the computer readable medium may include instructions that are executable to cause a processor to convert the network address into an alternative data format.

In addition, the computer readable medium may include instructions executable to cause a processor to receive a new network address assigned a shared designation by a third client computer, automatically, from the third client computer, to publish the new network address, and to send the new network address to the second client computer.

The computer readable medium also may include instructions executable to cause a processor to receive a new network address assigned a shared designation by the first client computer, automatically, from the first client computer, to publish the new network address, and to send the new network address to the second client computer.

The computer readable medium may include instructions executable to cause a processor to receive a subscription request from a third client computer, and to send the network address to the third client computer in response to receiving the subscription request from the third client computer. The computer readable medium also may include instructions executable to cause a processor to categorize the network address. The network address may include network address data, and a source indication. The source indication may identify a publishing user associated with the network address. The computer readable medium also may include instructions executable to cause a processor to access an alert indicator indicating that the network address has been published, and to display the alert indicator in association with a display of the screen name in a buddy list.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

Referring now to the drawings, in which like reference numbers represent corresponding parts throughout:

FIG. 2a is a block diagram of a computer architecture;

FIG. 2b is an example of a table for storing received shared network addresses and associated information.

FIG. 2c is an example of a table for tracking group membership.

FIG. 2d is an example of a table for storing user preferences.

FIGS. 3a-3c are diagrams of a process for sharing network addresses;

DETAILED DESCRIPTION

Figure 1:
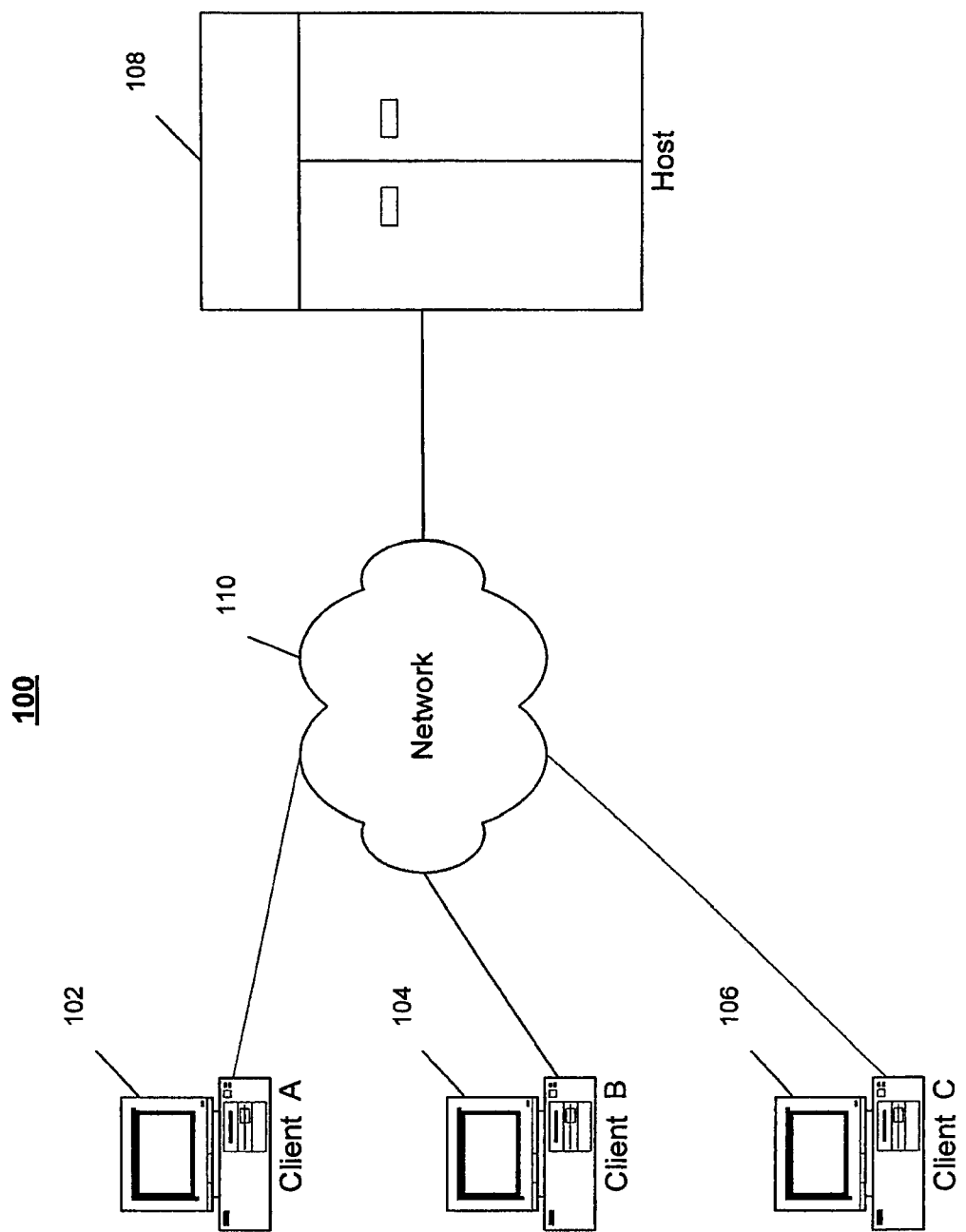
FIG. 1 is a block diagram of a communications system.

Systems and techniques for sharing network addresses (e.g., favorites) are described. For example, a web browser allows a user of a communications system to create and store favorites pointing to the network addresses of favorite web pages or network resources in a favorites list and to designate one or more of the stored favorites as shared or community accessible. In addition, the web browser allows the user to arrange the user's favorites list into folders and/or sub-folders and, at any time, to designate one or more folders as shared or community favorites folders. After the user designates a favorite or folder as shared, the web browser initiates an automatic upload of the favorite or the contents of the shared favorites folder to a host such that a copy (e.g., replica) of the favorite or the shared favorites folder is created on the host and made accessible to other users of the communications system. In the case of the shared favorites folder, any time the user subsequently adds a network address to the folder designated as a shared favorites folder, the newly added network address is automatically uploaded to the host where it is stored in the hosted shared favorites folder. Host stored favorites are thereafter made accessible to other users of the communications system.

For instance, the host may publish shared network addresses as items in a syndication feed such that other users of the communications system may access the shared favorites by subscribing to the syndication feed. Additionally or alternatively, the host may publish shared network addresses on one or more web pages or the host may send shared network addresses to one or more users of the communications system in electronic mail ("email") messages.

In another example, when the user adds a new network address to the user's favorites list, the web browser queries the user to determine whether the user wishes to share the newly added network address with other users of the communications system. In some implementations, this query may be conditioned on information known by the browser and/or the host that suggests the likelihood of the network address being shared, or the user wishing to share network addresses generally. Different mechanisms for querying the user to determine whether the user wishes to share the newly added network address are contemplated. For example, when the user adds a network address to the user's favorites list, the user may be presented with a window that allows the user to designate a customized name for the network address and that queries the user to determine whether the network address should be shared with other users of the communications system. Additionally or alternatively, the addition of a new network address to the user's favorites list may trigger the web browser to display a pop-up window querying whether the network address should be shared with other users of the communications system. If the user confirms that the newly added network address should be shared with other users, the web browser automatically uploads the newly added network address to the host where it is made accessible to other users of the communications system.

In some implementations, the host computer receives shared network addresses and automatically categorizes the shared network addresses based on a predefined categorization scheme and/or categorization rules. After categorizing the network addresses, the host computer compiles the network addresses and makes the network addresses available to users of the communications system.

FIG. 1 is a block diagram of an example of one arrangement of a communications system. Briefly, the communications system includes a first client, a second client, a third client, and a host. The first client is configured to automatically send a shared favorite to the host in response to the favorite being assigned a shared designation. Meanwhile, the second client is configured to send a shared favorite subscription request to the host. The host includes a receiver for receiving the shared favorite from the first client and for receiving the subscription request from the second client. In addition, the host includes a sender for sending the shared favorite to the second client in response to receiving the subscription request from the second client.

In more detail, and as illustrated in FIG. 1, communications system 100 includes client A 102, client B 104, and client C 106 which are electronically connected to host 108 through network 110.

Client A 102, client B 104, client C 106, and host 108 each may be implemented by, for example, a general purpose computer capable of responding to and executing instructions in a defined manner, a personal computer, a special-purpose computer, a workstation, a server, a notebook or laptop computer, a personal digital assistant ("PDA"), a wireless telephone, a device, a component, other equipment, or some combination of these items that is capable of responding to and executing instructions. In addition, client A 102, client B 104, client C 106 and host 108 each may include a central processing unit ("CPU") and memory/storage devices that store data and various programs such as operating systems and application programs. Furthermore, client A 102, client B 104, client C 106, and host 108 each also may include an input/output ("I/O") device and peripheral equipment such as a communications card or device (e.g., a modem or network adapter) for exchanging data with network 110.

Client A 102, client B 104, client C 106, and host 108 each may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the clients or host 108.

Network 110 includes hardware and/or software capable of enabling direct or indirect communications between client A 102, client B 104 and C 106 and host 108. Additionally or alternatively, network 110 may include hardware and/or software capable of enabling direct or indirect communications between client A 102, client B 104, and client C 106, or between client A 102, client B 104, and client C 106 and other communications devices (not shown) connected to network 110. As such, network 110 may include direct links between client A 102, client B 104, and client C 106 and host 108, and other communications devices (not shown) connected to network 110. Additionally or alternatively, network 110 may include one or more sub-networks (not shown) between the clients and host 108, and/or other communications devices connected to network 110.

Each network or sub-network may include, for example, a wired or wireless data pathway capable of carrying and receiving data. Examples of network 110 include the Internet, the world wide web, a wide area network ("WAN"), a local area network ("LAN"), analog or digital wired or wireless telephone networks, radio, television, cable, satellite, and/or any other delivery mechanisms capable of carrying data.

FIG. 2 is a block diagram of an example of a computer architecture 200 suitable for implementing one or more of client A 102, client B 104, client C 106 and/or host 108. The computer architecture includes: CPU 202 where computer instructions are processed; display interface 204 which provides communication interface and processing functions for rendering graphics, images, and text on a display; keyboard interface 206 which provides a communication interface to a keyboard; printer interface 208 which provides a communication interface to a hardcopy output device; pointing device interface 210 which provides a communication interface to a mouse or an equivalent processing device; random access memory ("RAM") 212 where computer instructions and data can be stored in a volatile memory device for processing by CPU 202; read-only memory ("ROM") 214 where invariant low-level systems code or data for basic system functions such as basic I/O, startup, or reception of keystrokes from a keyboard are stored in a non-volatile memory device; modem interface 216 which provides a communication interface to a computer network over a modem connection; computer network interface 218 which provides a communication interface to a computer network over a computer network connection; and disk 220 (e.g., a fixed disk, a removable disk, or a combination thereof). The disk 220 stores computer executable instructions for an operating system 222 and application programs 224, including, for example, a web browser 226, as well as data files 228. Data bus 230 provides bi-directional communication between the constituent devices and CPU 202.

RAM 212 interfaces with computer bus 230 so as to provide quick RAM storage to CPU 202 during execution of software programs such as the operating system 222, application programs 224, including, for example, the web browser 226, and device drivers. More specifically, CPU 202 loads computer executable instructions from disk 220 or other memory media into a region of RAM 212 in order to execute software programs. Data, such as, for example, data related to web browsing, is stored in RAM 212, where the data is accessed by CPU 202 during execution.

FIG. 2 illustrates one example of a computer architecture suitable for implementing one or more of client A 102, client B 104, client C 106 and/or host 108. However other architectures and communications devices also may be used to implement client A 102, client B 104, client C 106 and/or host 108.

Referring again to FIG. 1, the communications system 100 is configured to enable the automatic sharing of favorite network addresses. Client A 102, client B 104, and client C 106 each include at least one browser or micro-browser application, referred to hereinafter generally as browsers, for communicating with host 108 and accessing content and/or resources available on host 108 and/or other communications devices connected to network 110. Similarly, host 108 is configured to communicate with client A 102, client B 104, and client C 106 and to store content and/or resources such that client A 102, client B 104, and client C 106 and other communications devices connected to network 110 may access the hosted content and/or resources. In addition, host 108 may be further configured to publish and/or syndicate content, resources, data and/or other information. Furthermore, host 108 may be configured further still to function as an Internet service provider ("ISP"), an online service provider ("OSP"), and/or an instant messaging provider system. Host 108 may include one or more communications devices.

The browsers on client A 102, client B 104, and client C 106 allow users of client A 102, client B 104, and client C 106 to store the network addresses of favorite web pages and/or resources in local favorites lists. In addition, the browsers allow users to assign network addresses stored in or being added to the local favorites lists shared designations. For example, a user may assign a network address stored in a favorites list a shared designation by selecting the network address and manually instructing the browser to assign the network address a shared designation or by adding the network address to a folder within the favorites list that has been assigned a shared designation. Additionally or alternatively, when a user adds a network address to a favorites list, the browser may query the user to determine whether the user wishes to assign the network address a shared designation.

In some implementations, users of client A 102, client B 104, and client C 106 may be allowed to associate additional information with a network address to which they have assigned a shared designation. For example, a user may be allowed to associate a shared network address with a particular category or to associate a comment or note with a shared network address. Additionally or alternatively, a user may be allowed to specify a particular group of users with which a network address is to be shared. In this manner, members of a group may share network addresses with one another but not with all of the users of the communications system 100.

One or more of client A 102, client B 104, and client C 106 may be configured to transmit a network address and any associated information to host 108 automatically in response to the network address being assigned a shared designation. For example, one or more of client A 102, client B 104, and client C 106 may include an XML remote procedure call ("RPC") application program interface ("API") designed to transmit a network address and any associated information to host 108 automatically in response to the user network address being assigned a shared designation. In such an example, the XML-RPC API may wrap (e.g., encode) the network address and any associated information in an XML-RPC message and use a hypertext transfer protocol ("HTTP") POST command to send the network address and any associated information to host 108.

In some implementations, one or more of client A 102, client B 104, and client C 106 may be configured to associate additional information with a network address before automatically transmitting the network address to host 108. For example, one or more of client A 102, client B 104, and client C 106 may be configured to associate a network address with a timestamp indicating, for example, the date and time the network address was assigned a shared designation or the date and time the network address was transmitted to host 108 before transmitting the network address to host 108. In addition, one or more of client A 102, client B 104, and client C 106 also may be configured to associate a network address with an indication of the user that assigned the network address a shared designation before transmitting the network address to host 108.

Host 108 is configured to receive shared network addresses and information associated with the shared network addresses from client A 102, client B 104, or client C 106 and to subsequently make the received network addresses and associated information accessible to users of the communications system 100 and/or other communications devices connected to network 110.

In order to facilitate making the received shared network addresses available to users of the communications system 100 and/or other communications devices connected to network 110, host 108 may store received shared network addresses in, for example, a table, a database, or other data structure.

FIG. 2b illustrates an example of a table 238 for storing received shared network addresses and associated information on host 108. Table 238 includes a network address column 240, a time/date shared column 242, a sharing user column 244, a category column 246, and a group column 248. In addition, table 238 includes 11 shared network address entries 250, 252, 254, 256, 258, 260, 262, 264, 266, 268, and 270. Each shared network address entry includes a specific shared network address as well as additional data indicating the time and date the network address was shared, the user that shared the network address, a category associated with the network address, and a group with which the network address is to be shared.

For example, the shared network address entry 250 corresponding to the shared network address "www.espn.com" is associated with time/date shared information indicating that the network address was shared at 9:36 am on Sep. 3, 2005; sharing user information indicating that the network address was shared by Brian Jones; category information indicating that the network address is related to sports; and group information indicating that the network address is to be shared only with members of the "Jones' Family Headlines" group.

It is conceivable that multiple users may share the same network address. As a result, when host 108 receives a shared network address, host 108 may parse the table 238 of stored, previously received network addresses to determine whether the network address already exists in table 238. In some implementations, if host 108 determines that a network address already exists in table 238, host 108 may not store a duplicate copy of the network address in table 238. For example, host 108 may not store the newly received shared network address or host 108 may delete the previously received network address and replace it with the newly received shared network address. Alternatively, host 108 may store multiple copies of the same shared network address in table 238. Doing so may be particularly useful in the event that the sharing users have associated the same network address with different additional information (e.g., different categories).

Table 238 is merely one example of a data structure for storing received shared network addresses and additional information on host 108. Alternative data structures may be used to store received shared network addresses and additional information on host 108. Furthermore, data structures used to store network addresses and additional information may store more or less additional information than the additional information illustrated in FIG. 2b.

As discussed above, when host 108 receives a network address, the shared network address already may be associated with or assigned a category (or other designation or keyword or metadata). For example, when a user designates a network address as a network address to be shared, the user also may associate the network address with a particular category. Different users of the communications system 100 may categorize network addresses differently. For instance, one user may categorize the network address www.espn.com as sports whereas another user may categorize the network address www.espn.com as news.

As a result, in some implementations, host 108 may retain multiple categorizations associated with a single network address. In addition, when host 108 makes a network address associated with multiple categorizations accessible to users of the communications system 100, host 108 also may make the multiple categorizations associated with the network address accessible to users of the communications system 100.

Alternatively, in other implementations, host 108 may disassociate a shared network address from a categorization assigned by a user of the communications system 100 before making the shared network address accessible to users of the communications system 100. Additionally or alternatively, host 108 may automatically categorize a shared network address before making it accessible to users of the communications system 100.

The automatic categorization of network addresses by host 108 may be accomplished in many different ways and by various different processes. For example, host 108 may leverage the publicly accessible categorization scheme made available by the Open Directory Project ("ODP") (see http://dmoz.org). The ODP provides a database of web pages and/or content and a corresponding hierarchical scheme for categorizing the web pages and/or content. When host 108 receives a new network address, host 108 may perform a reverse lookup for the network address in the ODP database to determine the hierarchical categorization assigned to the network address by the ODP and thereafter assign the same categorization to the network address as that found in the ODP database. In the event that the network address has not been assigned a categorization in the ODP database, host 108 may iteratively repeat the reverse lookup procedure using a less specific part of the URL until a category assignment for the network address is discovered. For instance, if no category is found for www.cnn.com/stories/entertainment/12345.html, then host 108 may search the ODP database for a category for www.cnn.com/stories/entertainment. If that fails, host 108 may search the ODP database for a category for www.cnn.com/stories, and so on and so forth.

Additionally or alternatively, host 108 may leverage heuristics or text processing techniques to automatically categorize a received network address. For example, host 108 may parse textual content available at a network address and automatically categorize the network address based on keywords found in the textual content. Host 108 also may categorize a network address based on the categorization of one or more links embedded within a web page available at the network address.

Disassociating network addresses from categorizations assigned by users of the communications system 100 and/or automatically categorizing network addresses before making shared network addresses accessible to users of the communications system 100 may help prevent or at least limit confusing and/or redundant categorizations assigned to shared network addresses by users of the communications system 100.

In some implementations, host 108 may automatically categorize a received network address while simultaneously retaining one or more user-assigned categorizations for the network address. In such implementations, when the received network address is made accessible to users of the communications system 100, the network address may be accompanied by indications of the automatically assigned categorization and the one or more user-assigned categorizations, as well as information indicating the users that assigned the one or more user-assigned categorizations. Recipients of the network address then may be allowed to assign one of the one or more user-assigned categorizations or the automatically-assigned categorization to the network address. Additionally or alternatively, the recipient may assign a categorization to the network address that is distinct from both the one or more user-assigned categorizations and the automatically-assigned categorization. In this manner, the recipient may be presented with one or more proposed categorizations for the network address, yet still allowed to assign the network address a categorization that is most appropriate for the recipient's purposes.

As discussed above, host 108 is configured to make received network addresses available to users of the communications system 100 or other communications devices connected to network 110. Any number of techniques and/or mechanisms for making received network addresses accessible may be employed.

For example, host 108 may make received network addresses accessible by publishing received network addresses as items in one or more shared favorites syndication feeds. Such shared favorites syndication feeds may be XML-based syndication feeds such as, for example, resource description framework ("RDF") site summary ("RSS") syndication feeds, rich site summary ("RSS") syndication feeds, really simple syndication ("RSS") syndication feeds, or Atom syndication feeds. Alternatively, the syndication feeds may be of any other syndication feed format.

Host 108 may publish one or more shared favorites syndication feeds that are accessible by all users of the communications system 100 and all communications devices connected to network 110. Additionally or alternatively, access to one or more of the shared favorites syndication feeds may be limited to one or more users of the communications system 100 and/or one or more communications devices connected to network 110. For example, host 108 may enable one or more users of the communications system 100 to create a group or community of users with which to share network addresses by allowing one or more members of the group to control or restrict who may access, receive, and/or contribute to a collection of shared favorites (e.g., a shared favorites syndication feed) associated with the group.

In such implementations, host 108 may maintain a table, list, database, or other structure for storing the identities of users that are allowed to access, receive, and/or contribute to specific collections of shared network addresses. As such, when host 108 receives a shared network address from a member of a particular group and the shared network address is associated with group information identifying the particular group as the group with which the shared network address is to be shared, host 108 knows to limit who may access or receive the shared network address to the members of the particular group. In addition, when host 108 receives a shared network address that is associated with group information identifying a particular group with which to share the network address from a user that is not a member of the particular group, host 108 knows not to share the received network address with members of the particular group.

FIG. 2c illustrates an example of a table 272 for tracking which users belong to which groups, and are thus entitled to access, receive, and/or contribute to the group's collection of shared favorites. Table 272 includes a group name column 274 and an allowed subscribers column 276. In addition, table 272 includes two group membership entries 278 and 280. Each group membership entry includes a group name and a list of users that are allowed to access, receive, and/or contribute to the collection of shared network addresses associated with the group. For example, the group membership entry 278 associated with the "Jones' Family Headlines" group indicates that Brian Jones, Carol Jones, and Cathy Jones are allowed to access, receive, and/or contribute to the "Jones' Family Headlines" collection of shared network addresses. Therefore, referring again to FIG. 2b, when host 108 received network address entry 250 indicating that the network address www.espn.com had been shared by Brian Jones and that the network address was to be shared with members of the "Jones' Family Headlines" group, host 108 knew that the network address was intended to be shared with Carol Jones and Cathy Jones. In addition, host 108 knew that Brian Jones was allowed to share the network address with members of the "Jones' Family Headlines" group.

In some implementations, host 108 may allow an individual user (e.g., a group administrator) to create and control access to a group for sharing network addresses. For example, host 108 may allow a group administrator to specify a rostered list of users and/or a rostered list of communications devices that are allowed to access, receive, and/or contribute to a collection of shared network addresses. In addition, host 108 may allow the user to invite particular users to access, receive, and/or contribute to the shared favorites. For instance, the group administrator may indicate a desire to invite a particular user to join the group, and, in response, host 108 may send a communication (e.g., email message) to the particular user inviting the user to join the group. Furthermore, host 108 may allow the group administrator to require users interested in accessing, receiving, and/or contributing to the collection of shared network addresses to provide a password, or other form of identification or authentication, in order to access, receive, and/or contribute to the collection. In such implementations, the appropriate password may be supplied to a user upon being invited to join the group. Requiring that users supply identification or authentication information in order to access, receive, and/or contribute to a collection of shared favorites may serve to ensure that only users that have been invited to access, receive, and/or contribute to the collection of shared favorites actually do so.

Host 108 may be configured to allow a recipient of a shared favorites syndication feed to regulate, to some extent, the network addresses that are received through the shared favorites syndication feed. For example, host 108 may allow a recipient to create filters for filtering network addresses sent to the recipient through a shared favorites syndication feed. For instance, the user may be able to create filters that filter shared network addresses based on one or more different criteria, including, for example, date and/or time, source (e.g., sharing/publishing user), category, and/or keyword.

Allowing a recipient to regulate the network addresses received by the recipient through a shared favorites syndication feed may help ensure that the recipient receives shared network addresses that the recipient finds relevant and pertinent. For example, a recipient may indicate a desire to receive only network addresses categorized as being related to University of Maryland athletics in a shared favorites syndication feed. In such a scenario, host 108 may aggregate network addresses classified as being related to tens, hundreds, or thousands of different categories, but only publish network addresses categorized as being related to University of Maryland athletics in the shared favorites syndication feed made accessible to the user. Alternatively, host 108 may publish a shared favorites syndication feed including network addresses classified as being related to tens, hundreds, or thousands of different categories, yet only display to the recipient those network addresses published in the shared favorites syndication that are categorized as being related to University of Maryland athletics. In addition, the recipient may be able to implement additional filters such as a filter for regulating the source of network addresses received by the recipient through the shared favorites syndication feed. For example, the recipient may indicate a desire to receive only shared network addresses categorized as being related to University of Maryland athletics and shared by users that are listed in the recipient's buddy list, the recipient's contact list, or the recipient's address book.

In implementations where host 108 is configured to allow recipients of shared favorites syndication feeds to regulate the network addresses that they receive through shared favorites syndication feeds, host 108 may maintain a table, list, database, or other data structure for storing user preferences so as to enable filtering of the shared favorites syndication feeds in a manner that is consonant with the recipients' expressed preferences.

FIG. 2d illustrates an example of a table 282 for storing user preferences. Table 282 includes a subscriber (i.e., user) column 284, a time preference column 286, a publisher preference column 288, and a category preference column 290. In addition, table 282 includes three subscriber entries 292, 294, and 296. Each subscriber entry includes a subscriber name, time preference information, publisher preference information, and category preference information. For example, the subscriber entry 292 for subscriber Mike Donald includes time preference information indicating that Mike Donald only desires to receive shared network addresses that have been shared within the last five days, publisher preference information indicating that Mike Donald only desires to receive shared network addresses shared by Carol Jones, Cathy Jones, or Tom Smith, and category preference information indicating that Mike Donald only desires to receive network addresses categorized as being related to sports, news, travel, music, or Shakespeare. As such, when host 108 makes a shared favorites syndication feed accessible to Mike Donald, host 108 may only publish network addresses that have been shared by Carol Jones, Cathy Jones, or Tom Smith within the last five days and that are categorized as being related to sports, news, travel, music, or Shakespeare.

In addition to, or as an alternative to, host 108 being configured to allow a recipient of a shared favorites syndication feed to regulate the network addresses that are received through the shared favorites syndication feed, one or more of client A 102, client B 104, and client C 106 also may be configured to allow a recipient of a shared favorites syndication feed to regulate the network addresses that are received through the shared favorites syndication feed. For example, one or more of client A 102, client B 104, and client C 106 may include a news reader or aggregator for subscribing subscribe to and receiving one or more shared favorites syndication feeds. In such cases, the news reader or aggregator may be configured to filter shared favorites received by the reader based on one or more different criteria, including, for example date and/or time, source (e.g., sharing/publishing user), and/or category.

For example, one or more of client A 102, client B 104, and client C 106 may receive a shared favorites syndication feed including a number of shared network addresses, but filter the shared favorites syndication feed so as to display to a user only those network addresses in which the user has expressed an interest in receiving. For instance, a user may be able to configure one or more of client A 102, client B 104, and client C 106 to filter shared network addresses received from a shared favorites syndication feed based on one or more different criteria, including, for example, date and/or time, source (e.g., sharing/publishing user), category, and/or keyword.

In some implementations, host 108 and/or one or more of client A 102, client B 104, and client C 106 may be further configured to allow a parent or guardian to regulate the network addresses received by a child under the control of the parent or guardian from a shared favorites syndication feed. In such implementations, host 108 and/or one or more of client A 102, client B 104, and client C 106 may maintain a table, list, database or other data structure including parental control access authorizations for individual users and the network addresses made accessible to a user (e.g., a child) through a shared favorites syndication feed may be filtered according to parental control access authorizations associated with the user. In addition, before host 108 publishes a network address to a shared favorites syndication feed, the network address may be associated with a parental control ranking for the purposes of enabling the filtering of network addresses based on parental control access authorizations.

Host 108 also may make received network addresses accessible by publishing received network addresses on one or more shared favorites web pages in addition to, or as an alternative to, publishing a shared favorites syndication feed. A shared favorites web page may represent network addresses shared by an individual user of the communications system 100, a group of users of the communications system 100, or all users of the communications system 100. For instance, a shared favorites web page may include a list of hyperlinks corresponding to each network address an individual user has designated as a shared network address. In addition, the shared favorites web page may include additional information related to each listed hyperlink, such as, for example, a category assigned to the network address associated with the hyperlink, one or more keywords associated with a resource made available at the network address, and the date and/or time the individual user designated the network address as a network address to be shared. Alternatively, a shared favorites web page may include a list of hyperlinks corresponding to all of the network addresses shared by the members of a particular community or group. In some implementations, access to a shared favorites web page may be restricted by a restriction mechanism, such as, for example a password. A shared favorites web page also may include one or more selectable icons for enabling a user to indicate a desire to subscribe to a particular shared favorites syndication feed.

Host 108 also may make received favorites accessible by sending one or more received favorites to one or more users of the communications system 100 in one or more email messages.

Client A 102, client B 104, and client C 106 each are configured to access and/or receive network addresses shared by users of the communications system 100 and made accessible by host 108. For example, client A 102, client B 104, and client C 106 each may include newsreaders, aggregators, or browsers capable of receiving syndication feeds from host 108. Additionally or alternatively, client A 102, client B 104, and client C 106 each may include browsers capable of accessing shared favorites from a published web page or email software programs capable of receiving shared favorites in email messages.

In some implementations, users interested in accessing, receiving, and/or contributing to a collection of shared network addresses may be required to subscribe to the collection of shared network addresses. For example, subscribing may be as simple as communicating a subscription request or an indication of interest in accessing, receiving, and/or contributing to the collection of shared network addresses to host 108. Additionally or alternatively, subscribing may involve instructing a news reader or aggregator to subscribe to one or more shared favorites syndication feeds, registering with a shared favorites web page, or registering an email address for receiving shared network addresses with host 108. In some implementations, host 108 may not make received network addresses accessible to users of the communications system 100 until host 108 has received at least one subscription request for the shared network addresses.

As discussed above, in some implementations, host 108 may be configured to operate as an instant messaging provider system enabling the exchange of instant messages between client A 102, client B 104, and client C 106. In such implementations, client A 102, client B 104, and client C 106 include instant messaging applications and the instant messaging applications include buddy lists that allow users of client A 102, client B 104, and client C 106 to send and receive instant messages. The buddy lists display screen names or identities (e.g., buddies) of users of the communications system 100 with whom users of client A 102, client B 104, and client C 106 may engage in instant messaging sessions.

In such implementations, when host 108 receives a shared network address from a publishing user, host 108 makes the shared network address available to other users of the communications system 100 and also causes the instant messaging applications on client A 102, client B 104, and client C 106 to display alert indications (e.g., icons or other representations) in their buddy lists indicating that the publishing user recently shared a favorite. For example, an icon may be displayed next to the publishing user's screen name in the buddy lists. Consequently, users of the communications system 100 may be notified that the publishing user has recently shared a favorite without the publishing user having to independently contact all of the other users of the communications system 100.

FIG. 3 illustrates an example of a method for sharing network addresses. In general, the method 300 enables a user of a first client to share network addresses with a user of a second client merely by adding network addresses to a favorites directory resident on the first client and designated as a favorites directory to be shared (e.g., published). In addition, the method 300 enables a user of the second client to share network addresses with the user of the first client merely by adding network addresses to a favorites directory resident on the second client and designated as a favorites directory to be shared.

Briefly, the method 300 includes receiving a request to publish a shared favorites directory from the first client, creating a hosted shared favorites directory, generating a shared favorites syndication feed, receiving a shared favorites subscription request from the second client, and sending one or more shared network addresses to the second client in response to receiving the shared favorites subscription request. In addition, the method 300 includes receiving a network address from the first client, adding the received network address to the hosted shared favorites directory, updating the shared favorites syndication feed to include the network address as a new item, receiving a request for an updated shared favorites syndication feed from the second client, and sending the network address to the second client in response to receiving the request for an updated shared favorites syndication feed. The method 300 also includes receiving a new network address from the second client, adding the new network address to the hosted shared favorites directory, updating the shared favorites syndication feed to include the new network address as a new item, receiving a request for an updated shared favorites syndication feed from the first client, and sending the new network address to the first client in response to the request for an updated shared favorites syndication feed.

The method 300 will now be described in greater detail using client A 102, client B 104, and host 108 as examples of apparatuses for implementing the method 300. However, other apparatuses and/or arrangements also may be used to implement the method 300.

Client A 102 sends a request to host 108 to publish a local shared favorites directory (302-C1). Host 108 receives the request to publish the shared favorites directory (302-H). In response, host 108 creates a hosted shared favorites directory for storing shared network addresses received by host 108 (304-H) and generates a shared favorites syndication feed for publishing network addresses stored in the hosted shared favorites directory (operation 306-H).

In the event that the local shared favorites directory includes one or more network addresses to be shared at the time the request to publish the local shared favorites directory is sent, the network addresses to be shared may be sent concurrently with the request to publish the shared favorites directory and stored in the hosted shared favorites directory. In addition, the shared network addresses stored in the hosted shared favorites directory may be published as items in the shared favorites syndication feed. If the local shared favorites directory does not include any network addresses to be shared at the time the request to publish the local shared favorites directory is sent, the hosted shared favorites directory may remain empty until a shared network address is received from client A 102. In addition, the shared favorites syndication feed may remain empty until a shared network address is received from client A 102.

Client A 102 sends an invitation to client B 104 to subscribe to the shared favorites syndication feed (308-C1). For example, client A 102 may send an email to client B 104 inviting client B 104 to subscribe to the shared favorites syndication feed. The email may include the URL of the shared favorites syndication feed along with a password required to access the shared favorites syndication feed. Additionally or alternatively, in some implementations, host 108 may send an invitation to client B 104 to subscribe to the shared favorites syndication feed. In still other implementations, the invitation to subscribe to the shared favorites syndication feed may be passive. For example, host 108 may maintain a web page that lists all shared favorites syndication feeds available for subscription.

Client B 104 receives the invitation to subscribe to the shared favorites syndication feed (308-C2), and sends a subscription request (310-C2). Sending a subscription request may include configuring a news reader or aggregator resident on client B 104 to subscribe to the shared favorites syndication feed. Additionally or alternatively, sending a subscription request to host 108 may include sending a password or alternative form of identification or authentication. The request may be sent to host 108, as shown, or alternatively, it may be sent to client A 102 and serviced by client A 102 or passed along to host 108 for servicing.

Figure 3A:
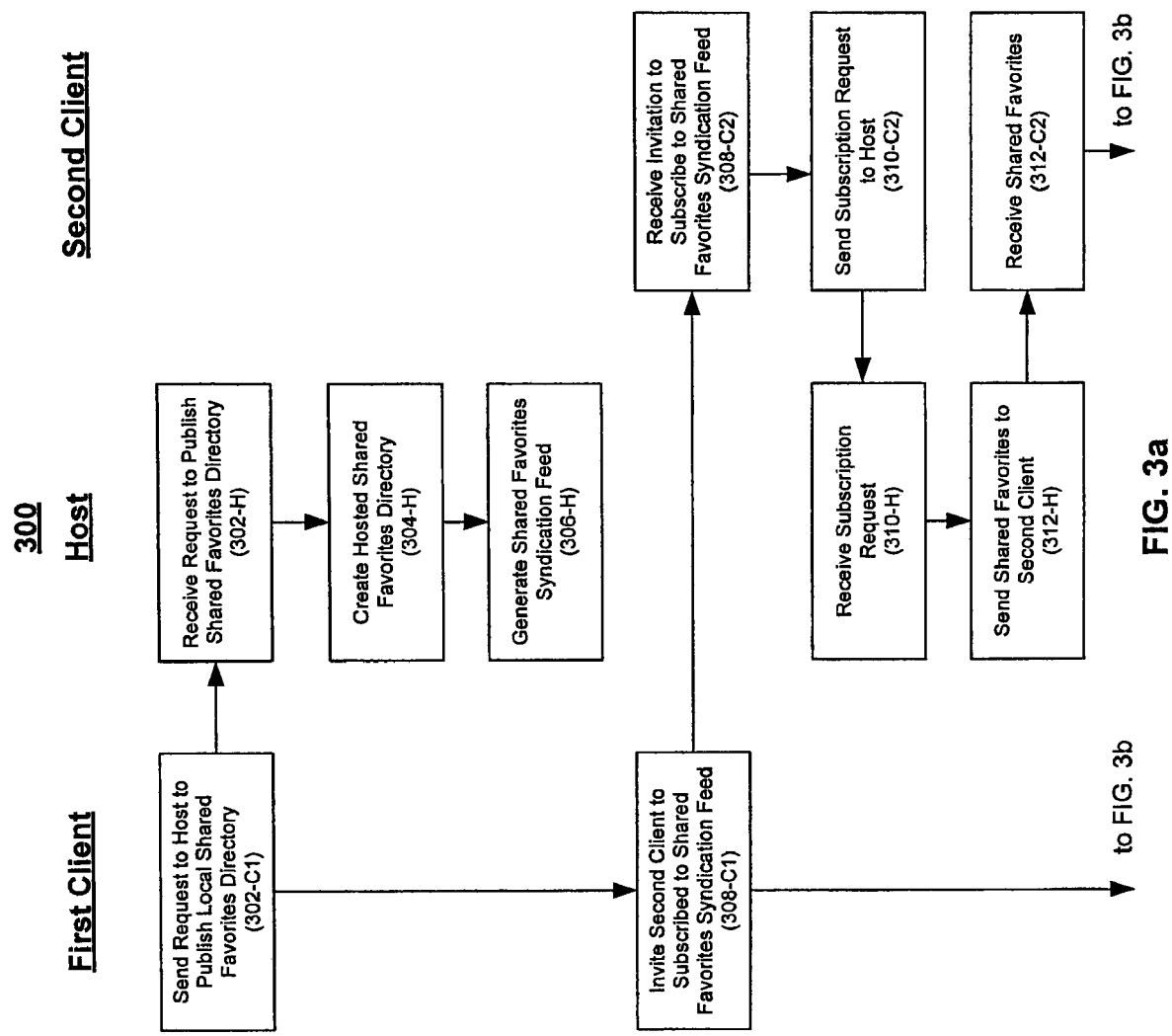

In the implementation illustrated by FIG. 3a, host 108 receives the subscription request from client B 104 (310-H) and sends the shared network addresses stored in the hosted shared favorites directory to client B 104 (312-H). Client B 104 receives the shared network addresses as items in the shared favorites syndication feed (312-C2). In the event that no shared network addresses have been stored in the hosted shared favorites directory yet, no shared network addresses will have been published to the shared favorites syndication feed, and, consequently, no shared network addresses are sent to client B 104 from host 108.

Figure 3B:
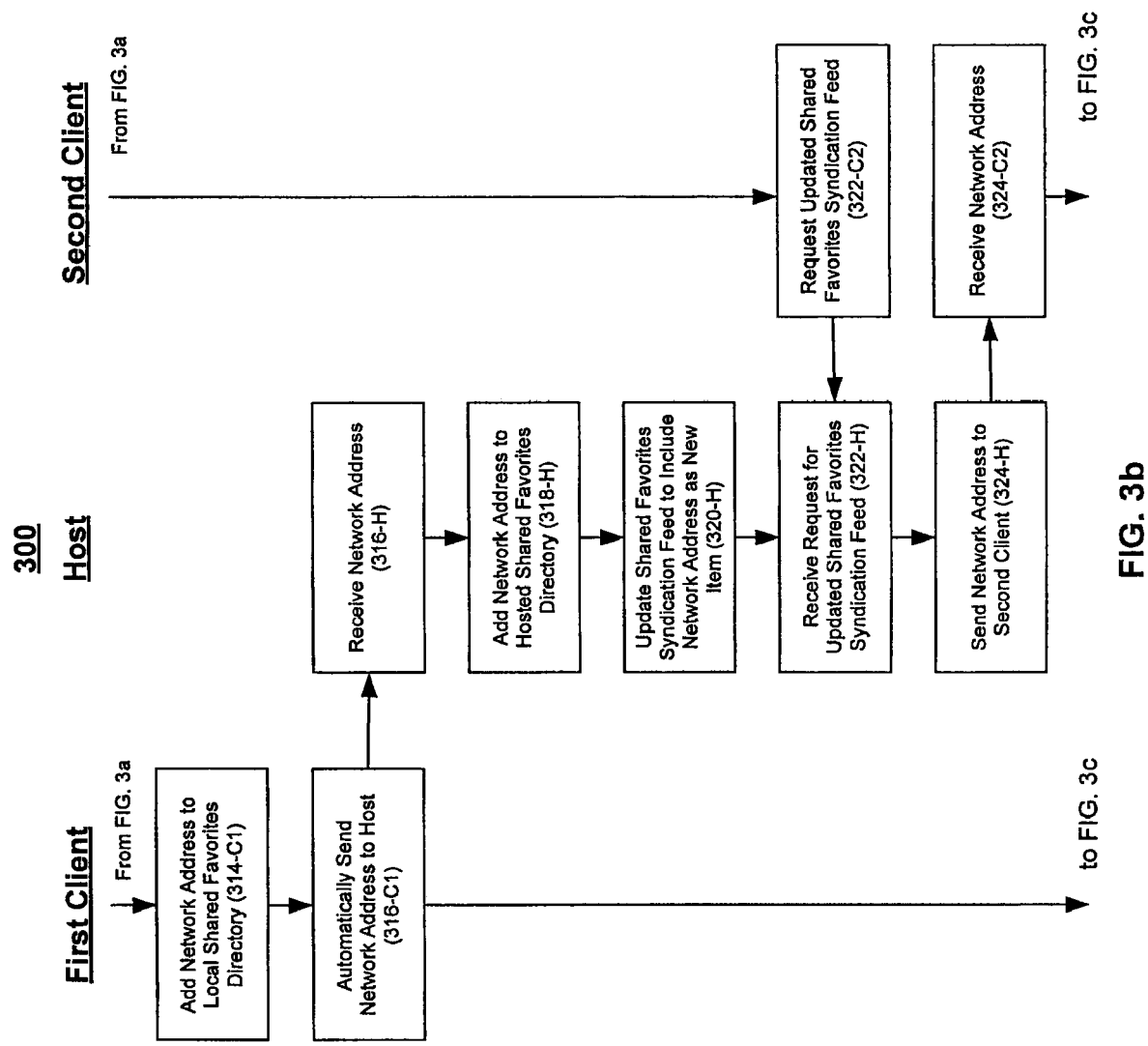

Referring to FIG. 3b, the user of client A 102 adds a network address to the local shared favorites directory resident on client A 102 (314-C1). In addition, the user of client A 102 also may attach additional content and/or data to, or otherwise associate additional content and/or data with, the network address. Such additional content and/or data may include comments, notes, images, or category data. For example, the user of client A 102 may add a comment or note to the network address that provides further information about the content and/or resources available from the network address or a comment or note that explains why the user of client A 102 found the content and/or resources available from the shared network address to be interesting, useful, and/or valuable. Additionally or alternatively, the user of client A 102 may attach a representative image (e.g., a thumbnail image) of the network address to the network address. Furthermore, the user of client A 102 may add an indication of source or other identifier identifying the user of client A 102 as the sharer (e.g., publisher) of the network address to the network address. Alternatively, client A 102 may attach an indication of source identifying the user of client A 102 as the sharer of the shared network address to the shared network address automatically. The user of client A 102 also may add a timestamp to the shared network address indicating the date and/or time at which the user of client A 102 designated the network address as a network address to be shared. Additionally or alternatively, client A may assign a timestamp to the network address automatically in response to the user of client A 102 designating the network address as a network address to be shared.

In response to the user of client A 102 adding the network address and associated content, if any, to the local shared favorites directory resident on client A 102, client A 102 automatically sends the network address and associated content, if any, to host 108 (316-C1).

Host 108 receives the network address (316-H) and adds the network address and associated content, if any, to a hosted shared favorites directory (318-H). The hosted shared favorites directory may be a table, such as, for example, table 238 of FIG. 2b, or other data structure for maintaining shared network addresses and associated content. In addition, host 108 updates the shared favorites syndication feed so that the shared favorites syndication feed includes the network address and associated content, if any, as a new item in the shared favorites syndication feed (320-H). In order to publish the network address and associated content, if any, as an item in the shared favorites syndication feed, host 108 may convert the network address and associated content, if any, into the proper format for complying with the appropriate syndication feed specification.

In the implementation illustrated in FIG. 3b, after subscribing to the shared favorites syndication feed, client B 104 intermittently or periodically requests updates to the shared favorites syndication feed (322-C2). For example, a news reader or aggregator resident on client B 104 may intermittently or periodically poll the shared favorites syndication feed for updates. Host 108 receives the request for an update to the shared favorites syndication feed (322-H) and sends the network address and associated content, if any, to client B (324-H). Client B 104 receives the network address and associated content, if any, as a new item in the syndication feed (324-C2).

After receiving the network address and associated content, if any, the user of client B 104 may be given the opportunity to add comments associated with the shared network address to the shared favorites syndication feed. In this manner, the users of clients A 102 and B 104 may initiate a dialogue regarding shared network addresses in addition to sharing network addresses.

In addition, after receiving the network address, client B 104 may import the network address from the shared favorites syndication feed to a local favorites directory resident on client B 104 automatically. Alternatively, client B 104 may enable the user of client B 104 manually to instruct client B 104 to import the network address from the shared favorites syndication feed into the local favorites directory.

In some implementations, before importing the network address from the shared favorites syndication feed to the local shared favorites directory, client B 104 may automatically assign one or more category designations to the imported network address based on one or more category designations associated with the network address in the shared favorites syndication feed. Assigning one or more category designations to the imported network address may include storing the imported network address in one or more sub-directories (e.g., folders) corresponding to the one or more category designations assigned to the imported network address. For example, the network address www.espn.com may be associated with both a sports category designation and a news category designation in the shared favorites syndication feed. Therefore, when client B 104 imports the network address www.espn.com into the local shared favorites directory, client B 104 may store the network address in a "Sports" folder, a "News" folder, or both.

Alternatively, before importing the shared network address from the shared favorites syndication feed, client B 104 may prompt the user of client B 104 to assign a category designation to the network address. In some implementations, client B 104 may provide category recommendations to the user of client B 104 based on one or more category designations associated with the shared network address in the shared favorites syndication feed.

In some scenarios, the network address to be imported from the shared favorites syndication feed to the local favorites directory already may be stored in the local favorites directory. Therefore, client B 104 may make a determination as to whether the network address already exists in the local favorites directory before importing the network address to the local favorites directory. In some implementations, if client B 104 determines that the network address already exists in the local shared favorites directory, client B 104 may not import the shared network address 104 to the local shared favorites directory.

In other implementations, if client B 104 determines that the network address already exists in the local shared favorites directory, client B 104 may compare the category designation associated with the network address in the local shared favorites directory with one or more category designations associated with the network address in the shared favorites syndication feed. In the event that the category designation associated with the network address in the local shared favorites directory is different than one or more of the category designations associated with the network address in the shared favorites syndication feed, client B 104 may include one or more mechanisms for alerting a user of client B 104 of the discrepancy and allowing the user to specify an appropriate category designation for the network address. Alternatively, client B 104 may include one or more mechanisms for resolving the discrepancy automatically. For example, if the user of client B 104 manually added the network address and associated category designation to the local shared favorites directory or if the user of client B manually assigned the category designation associated with the network address in the local shared favorites directory, client B 104 may retain the category designation associated with the network address in the local shared favorites directory. However, if the network address in the local shared favorites directory was imported to the local shared favorites directory from the shared favorites syndication feed and the category designation associated with the network address was not assigned to the network address by the user, client B 104 may reassign the category designation associated with the network address in the local shared favorites directory based on one or more category designations associated with the network address in the shared favorites syndication feed or client B 104 may import one or more additional copies of the network address to the local shared favorites directory and assign the one or more additional copies of the network addresses category designations based on one or more category designations associated with the network address in the shared favorites syndication feed.

In some implementations, host 108 may be configured to be able to push updates to the shared favorites syndication feed from host 108 to client B 104 rather than, or in addition to, updates to the shared favorites syndication feed being pulled from host 108 by client B 104. For example, host 108 may receive a subscription request from client B 104 and thereafter push updates to the shared favorites syndication feed to client B 104 periodically. Additionally or alternatively, host 108 may push updates to the shared favorites syndication feed to client B 104 in response to a triggering event, such as, for example, receiving one or more new shared network addresses from client A 102. In implementations where host 108 is configured to be able to push updates to the shared favorites syndication feed to client B 104, the user of client B 104 may be alerted of the ability of host 108 to push updates to the shared favorites syndication feed to client B 104, and given the opportunity to opt out of receiving pushed updates to the shared favorites syndication feed. If the user of client B 104 decides against receiving pushed updates to the shared favorites syndication feed, updates to the shared favorites syndication feed still may be received by client B 104 by pulling updates from host 108.

Referring to FIG. 3*c*, the user of client B 104 adds a new network address to a local shared favorites directory resident on client B 104 (326-C2). In addition, the user of client B 104 also may attach additional content and/or data to, or otherwise associate additional content and/or data with, the network address. In response to the user of client B 104 adding the new network address to the local shared favorites directory resident on client B 104, client B 104 automatically sends the new network address to host 108 (628-C2). Host 108 receives the new network address (328-H) and adds the new network address to the hosted shared favorites directory (330-H). In addition, host 108 updates the shared favorites syndication feed so that the shared favorites syndication feed includes the new network address as a new item in the feed (332-H).

After subscribing to the shared favorites syndication feed, client A 102 intermittently or periodically requests updates to the shared favorites syndication feed (334-C1). For example, a news reader or aggregator resident on client A 102 may intermittently or periodically poll the shared favorites syndication feed for updates. Host 108 receives the request for an update to the shared favorites syndication feed (334-H) and sends the new network address to client A 102 (336-H). In some implementations, host 108 may send the network address originally shared by client A 102 at 316-C1 to client A 102 as part of the update to the shared favorites syndication feed. In this manner, client A 102 may have access to all of the shared network addresses in the shared favorites syndication feed, not just the network address shared by other users/communications devices. In other implementations, host 108 may not send the network address originally shared by client A 102 at 316-C1 to client A 102 as part of the update to the shared favorites syndication feed. In such implementations, host 108 may retain an indication associated with the shared network address that identifies client A 102 as the source of the shared network address and filter the shared network address from the update to the shared favorites syndication feed sent to client A 102 based on the indication that client A 102 was the source of the shared network address.

Client A 102 receives the new network address as a new item in the syndication feed (336-C1). In some implementations, client A 102 may import the new network address from the shared favorites syndication feed to a local favorites directory resident on client A 102 automatically. Alternatively, in other implementations, client A 102 may enable the user of client A 102 manually to instruct client A 102 to import the new network address from the shared favorites syndication feed into the local favorites directory.

FIGS. 3*a*-3*c* illustrate a process by which client A 102 and client B 104 subscribe to and contribute to a shared favorites syndication feed initiated by client A 102. Of course, one or more of client A 102 and client B 104 may subscribe to and/or contribute to one or more additional shared favorites syndication feeds in addition to, or as an alternative to, the shared favorites syndication feed initiated by client A 102. In such a scenario, users of client A 102 and/or client B 104 may be made aware of the existence of and their ability to subscribe to additional shared favorites syndication feeds through invitations to subscribe to one or more additional shared favorites syndication feeds. Additionally or alternatively, host 108 may maintain one or more web pages listing one or more shared favorites syndication feeds to which users of client A 102 and/or client B 104 may subscribe. In some implementations, such web pages may include selectable icons and/or links that enable users of client A 102 and/or client B 104 to subscribe to the one or more shared favorites syndication feeds.

Figure 4:
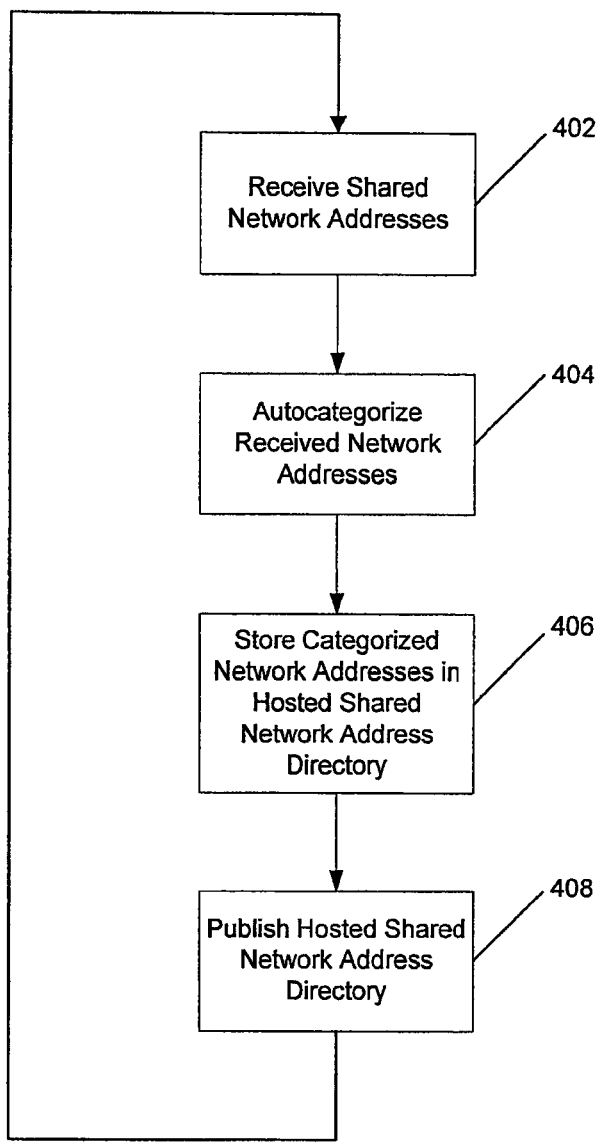
FIG. 4 is a flow chart illustrating a process for sharing network addresses.

Referring to FIG. 4, a process 400 for sharing network addresses includes receiving network addresses, automatically categorizing received network addresses, storing categorized network addresses in a hosted shared favorites directory, and publishing the contents of the shared favorites directory.

More particularly, host 108 intermittently receives network addresses from communications devices connected to network 110 (402). Network addresses received by host 108 are sent by communications devices connected to network 110 automatically in response to being assigned shared designations. Upon receipt of a network address, host 108 automatically categorizes the received network addresses (404). For example, host 108 may assign a received shared network address the same categorization that the ODP has assigned the received network address. The categorized network addresses are stored in a hosted shared network address directory (406) and the hosted shared network address directory is published (408). In some implementations, before storing and/or publishing a received network address, host 108 may verify that the network address has not been stored and/or published previously or that the network address has not been stored and/or published within a predefined period of time. For example, the shared network addresses stored in the hosted shared network address directory may be published as items in one or more syndication feeds. Additionally or alternatively, the shared network addresses stored in the hosted shared network address directory may be published to one or more web pages. Furthermore, the published shared network addresses may be published so as to identify the categories automatically assigned to the shared network addresses by host 108.

Host 108 continues to receive network addresses from communications devices connected to network 110 intermittently (402). When new network addresses are received, they are automatically categorized (404), and stored in the hosted shared network address directory (406). In addition, the published version of the shared network addresses is updated (408) to reflect the newly shared network addresses. For example, a newly shared network address may be published as a new item in a syndication feed or as a new hyperlink on a web page.

The described systems, methods, and techniques are not limited to any particular hardware or software configuration. Rather, they may be implemented in digital electronic circuitry, computer hardware, firmware, software, or in combinations thereof.

Apparatuses embodying these techniques may include appropriate input and output devices, a computer processor, and a computer program product tangibly embodied in a machine-readable storage device for execution by a programmable processor.

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including, for example semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

A number of implementations have been described. Nevertheless, it will be understood that various modifications may be made. For example, advantageous results may be achieved if the disclosed techniques are performed in a different order and/or if components in the disclosed systems are combined in a different manner and/or replaced or supplemented by other components.

In addition, it will be understood that the terms network address, favorite, and bookmark as used above may be used interchangeably and that the terms network address, favorite, and bookmark may be used to refer specifically to a network address or a pointer to a network address as well as any data associated with the network address or pointer to a network address such as, for example, comment data, category data, representative image data, source data, date data, and/or time data.

Accordingly, other implementations are within the scope of the following claims.

What is claimed is:

1. A computer-implemented method for sharing a network address, the method comprising:

receiving, at a host processor, a request from a first client computer via an electronic network to host a shared directory;

generating the shared directory for storing one or more shared network addresses;

generating a shared syndication feed for publishing the one or more shared network addresses;

receiving a first shared network address from a second client computer for publishing in the shared syndication feed;

determining whether the first shared network address has been previously published in the shared syndication feed; and sending the first shared network address to a first recipient user via the shared syndication feed based on determining that the first shared network address has not been previously published in the shared syndication feed and that the first shared network address has been shared within a time preference set by the first recipient user.

2. The computer-implemented method of claim 1, further comprising:
receiving, at the host processor from the first client computer, the first shared network address in a first data format, the first shared network address being assigned a shared designation by the first client computer, and comprising network address data and a source indication that identifies a publishing user.

3. The computer-implemented method of claim 2, further comprising:
converting the first shared network address into a second data format, wherein the second data format comprises a feed format.

4. The computer-implemented method of claim 1, further comprising:
categorizing the first shared network address into at least one category by performing a look-up of a categorization database using the first shared network address.

5. The computer-implemented method of claim 1, further comprising:
determining, based on a user group identification, whether a new user is permitted by a publishing user to receive the first shared network address.

6. The computer-implemented method of claim 5, further comprising:
sending, in response to a subscription request and based on a determination that the new user is permitted to receive the first shared network address, the first shared network address to the first client computer as part of a syndication feed.

7. The computer-implemented method of claim 6, wherein the subscription request includes a filtering criterion.

8. The computer-implemented method of claim 7, wherein the first shared network address comprises source data, and the filtering criterion is a source.

9. The computer-implemented method of claim 7, wherein the first shared network address comprises a publication time data, and the filtering criterion is a publication time.

10. The computer-implemented of claim 1, further comprising:
Storing a network address in the shared directory on a host computer.

11. A device for sharing a network address comprising:
a memory device for storing instructions; and
a receiver that includes at least one processor that is configured to:
receive, at a host processor, a request from a first client computer via an electronic network to host a shared directory;
generate the shared directory for storing one or more shared network addresses;
generate a shared syndication feed for publishing the one or more shared network addresses;
receive a first shared network address from a second client computer for publishing in the shared syndication feed;
determine whether the first shared network address has been previously published in the shared syndication feed; and
send the first shared network address to a first recipient user via the shared syndication feed based on determining that the first shared network address has not been previously published in the shared syndication feed and that the first shared network address has been shared within a time preference set by the first recipient user.

12. The device of claim 11, wherein the at least one processor further is configured to:
receive, at the host processor from the first client computer, the first shared network address in a first data format, the first shared network address being assigned a shared designation by a host computer and comprising network address data and a source indication that identifies a publishing user.

13. The device of claim 12, wherein the at least one processor is further configured to:
convert the first shared network address into a second data format, wherein the second data format comprises a feed format.

14. The device of claim 11, wherein the at least one processor is further configured to:
categorize the first shared network address into at least one category by performing a look-up of a categorization database using the first shared network address.

15. The device of claim 11, wherein the at least one processor is further configured to:
determine, based on a user group identification, whether a new user is permitted by a publishing user to receive the first shared network address.

16. The device of claim 15, wherein the at least one processor is further configured to:
send, in response to a subscription request and based on a determination that the new user is permitted to receive the first shared network address, the first shared network address to the first client computer as part of a syndication feed.

17. The device of claim 16, wherein the subscription request includes a filtering criterion.

18. The device of claim 17, wherein the first shared network address comprises source data, and the filtering criterion is a source.

19. The device of claim 17, wherein the first shared network address comprises a publication time data, and the filtering criterion is a publication time.

20. The device of claim 11, wherein the at least one processor is further configured to:
store the first shared network address in the shared directory on the first client computer.

* * * * *